United States Patent
Lee

(10) Patent No.: US 10,636,238 B2
(45) Date of Patent: Apr. 28, 2020

(54) COMPUTER-READABLE RECORDING MEDIUM CONTAINING VEHICLE CONTROL METHOD AND PROGRAM

(71) Applicants: Hyundai Motor Company, Seoul (KR); Kia Motors Corporation, Seoul (KR)

(72) Inventor: Jae Jun Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/874,310

(22) Filed: Jan. 18, 2018

(65) Prior Publication Data
US 2019/0080532 A1    Mar. 14, 2019

(30) Foreign Application Priority Data

Sep. 12, 2017  (IN) .............................. 201711032196

(51) Int. Cl.
| | | |
|---|---|---|
| *G07C 9/23* | (2020.01) | |
| *G07C 9/00* | (2020.01) | |
| *B60R 25/24* | (2013.01) | |
| *B60R 25/01* | (2013.01) | |
| *H04W 84/18* | (2009.01) | |
| *H04W 4/80* | (2018.01) | |
| *H04W 4/40* | (2018.01) | |

(52) U.S. Cl.
CPC ............... *G07C 9/23* (2020.01); *B60R 25/01* (2013.01); *B60R 25/24* (2013.01); *B60R 25/241* (2013.01); *G07C 9/00309* (2013.01); *G07C 9/00571* (2013.01); *B60R 2325/101* (2013.01); *B60R 2325/205* (2013.01); *G07C 9/0069* (2013.01); *G07C 2009/0038* (2013.01); *G07C 2009/00793* (2013.01); *G07C 2009/00841* (2013.01); *H04W 4/40* (2018.02); *H04W 4/80* (2018.02); *H04W 84/18* (2013.01)

(58) Field of Classification Search
CPC ............................ G07C 9/00039; B60R 25/01
USPC ................................. 340/5.5–5.54
See application file for complete search history.

(56) References Cited

U.S. PATENT DOCUMENTS

| | | | | |
|---|---|---|---|---|
| 8,217,754 B1* | 7/2012 | Lerner | .............. | G07C 9/00103 340/5.61 |
| 10,187,793 B2* | 1/2019 | Petel | .................. | H04L 63/0492 |
| 2005/0125118 A1* | 6/2005 | Chalker | ................. | G06F 9/453 340/539.1 |
| 2015/0310675 A1* | 10/2015 | Park | ....................... | G07C 5/008 701/31.5 |

(Continued)

FOREIGN PATENT DOCUMENTS

| | | |
|---|---|---|
| JP | 2011-247076 A | 12/2011 |
| JP | 2015-145578 A | 8/2015 |

(Continued)

*Primary Examiner* — Allen T Cao
(74) *Attorney, Agent, or Firm* — Morgan, Lewis & Bockius LLP

(57) ABSTRACT

A vehicle control method using a smartphone may include pairing a smartphone of a driver with a head unit of a vehicle, the head unit of the vehicle turning on an application in the smartphone through Bluetooth communication, authorizing the driver through the application in the smartphone, and the head unit unlocking a door of the vehicle through a smart key unit of the vehicle.

8 Claims, 6 Drawing Sheets

(56) References Cited

U.S. PATENT DOCUMENTS

| | | | |
|---|---|---|---|
| 2016/0144857 A1* | 5/2016 | Ohshima | G05D 1/0061 |
| | | | 701/23 |
| 2016/0214571 A1* | 7/2016 | Othmer | B60R 25/209 |
| 2016/0300417 A1 | 10/2016 | Hatton | |
| 2016/0363991 A1* | 12/2016 | Schlecht | G06F 3/011 |
| 2017/0089104 A1* | 3/2017 | Kowalewski | E05B 81/80 |
| 2017/0186251 A1* | 6/2017 | Lee | G07C 9/00007 |
| 2017/0238175 A1* | 8/2017 | Miyazawa | H04W 12/06 |
| | | | 726/6 |
| 2018/0099643 A1* | 4/2018 | Golsch | B60W 10/08 |

FOREIGN PATENT DOCUMENTS

| | | |
|---|---|---|
| KR | 10-2013-0037947 A | 4/2013 |
| KR | 10-2016-0013334 A | 2/2016 |

\* cited by examiner

COMPUTER-READABLE RECORDING MEDIUM CONTAINING VEHICLE CONTROL METHOD AND PROGRAM

CROSS-REFERENCE TO RELATED APPLICATION

The present application claims priority to Indian Patent Application No. 201711032196 filed on Sep. 12, 2017, the entire contents of which is incorporated herein for all purposes by this reference.

BACKGROUND OF THE INVENTION

Field of the Invention

The present invention relates to a vehicle control method using a smart key system and, more particularly, to a vehicle control method using a driver's smartphone, in place of a fob, in a smart key system.

Description of Related Art

A smart key system is a system that enables a user carrying a fob to open and close the door of a vehicle or start an engine of the vehicle without additional key insertion or manipulation. A fob having therein inherent identification information sends the inherent identification information to an electronic control unit (ECU) disposed in a vehicle, and the ECU reads the received inherent identification information to perform a user authorization. When the user authorization succeeds, the ECU may execute a vehicle door opening and closing or engine control command.

Such a fob is small and easy to carry. However, the driver may become unable to operate the vehicle when the driver loses the fob or leaves the fob at a place other than the vehicle.

In recent years, mobile phones (smartphones) configured wherein various applications are installed in each mobile phone and a desired application is executed by simply touching a liquid crystal display of the mobile phone to provide various services have been widely popularized due to the rapid development of information technology (IT).

However, smartphone applications for use with vehicles have not been readily adopted, with the result that only a limited immobilizer system, in which vehicle operation and security functions depend on the smart key, has been popularized, which has not kept pace with the development of IT.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

Accordingly, various aspects of the present invention are directed to providing a computer-readable recording medium containing a vehicle control method and program that substantially obviates one or more problems due to the limitations and disadvantages of the related art.

Various aspects of the present invention are directed to providing a method of controlling a vehicle, unlocking a door and turning on an engine of the vehicle using a driver's smartphone.

Additional advantages, objects, and features of the invention will be set forth in part in the description which follows, and in part will become apparent to those having ordinary skill in the art upon examination of the following, or may be learned from practice of the invention. The objectives and other advantages of the invention may be realized and attained by the structure particularly pointed out in the written description and claims hereof, as well as the appended drawings.

To achieve these objects and other advantages in accordance with the purpose of the invention, as embodied and broadly described herein, a vehicle control method using a smartphone includes pairing a smartphone of a driver with a head unit of a vehicle, the head unit of the vehicle initiating an application in the smartphone through Bluetooth communication, authorizing the driver through the application in the smartphone, and the head unit unlocks a door of the vehicle through a smart key device of the vehicle.

The vehicle control method may further include the smart key device of the vehicle entering an active mode when the driver pushes a toggle button of the vehicle.

The vehicle control method may further include the smart key device waking up the head unit through controller area network (CAN) communication.

The vehicle control method may further include the driver inputting a personal identification number (PIN) code through the application in the smartphone.

The PIN code input to the smartphone may be sent to the head unit through serial port profile (SPP) communication.

The step of authorizing the driver may include the head unit of the vehicle determining whether the received PIN code is identical to a predetermined PIN code.

The vehicle control method may further include the head unit of the vehicle sending a door unlock signal to the smart key device upon determining that the received PIN code is identical to the predetermined PIN code.

The door unlock signal may be sent in a form of a CAN message.

The vehicle control method may further include the head unit sending a PIN code re-input signal to the smartphone upon determining that the received PIN code is not identical to the predetermined PIN code.

In another aspect of the present invention, a vehicle control method using a smartphone includes pairing a smartphone of a driver with a head unit of a vehicle, the head unit of the vehicle turning on an application in the smartphone through Bluetooth communication, authorizing the driver through the application in the smartphone, and the head unit turning on an engine of the vehicle through a smart key device of the vehicle.

The vehicle control method may further include the smart key device of the vehicle entering an active mode when the driver pushes a start button of the vehicle.

The vehicle control method may further include the head unit of the vehicle sending an engine on signal to the smart key device upon determining that a received PIN code is identical to a predetermined PIN code.

The engine on signal may be sent in a form of a CAN message.

The engine on signal may include an engine acceleration (ACC) on signal, an engine ignition on signal, and an engine driving signal.

In a further aspect of the present invention, there is provided a computer-readable recoding medium containing the vehicle control method and a program configured wherein the vehicle control method is realized by a processor.

It is to be understood that both the foregoing general description and the following detailed description of the present invention are exemplary and explanatory and are intended to provide further explanation of the invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
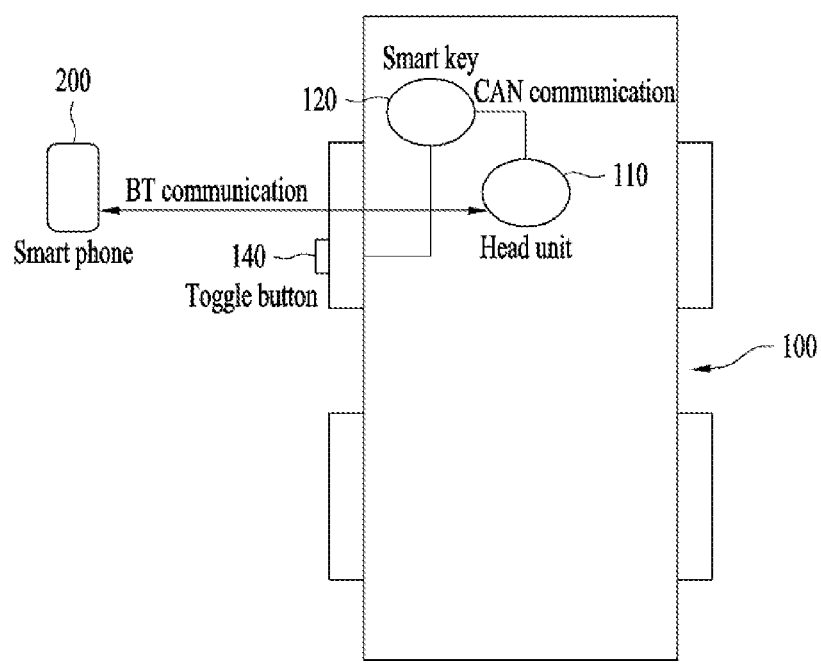
FIG. 1 is a schematic view showing the interaction between a smart key of a vehicle and a driver's smartphone according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, the terms "comprises", "has", "arranges", and "includes" when used herein should be interpreted not to exclude other elements but to further include such other elements since the corresponding elements may be inherent elements, unless mentioned otherwise.

In addition, a singular representation used in the description of embodiments and claims may include a plural representation unless the context clearly indicates otherwise, and the term "and/or" used in the present specification should be understood as any or all possible combinations of one or more enumerated items.

Figure 2:
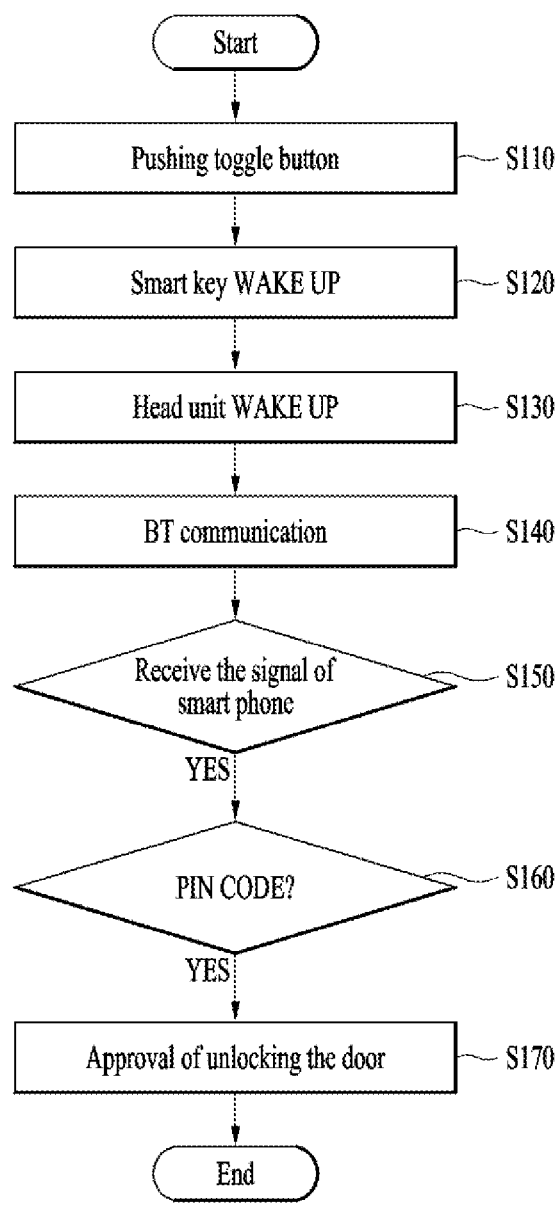
FIG. 2 is a view showing an exemplary embodiment of a method of operating a smart key of a vehicle.

FIG. 1 is a schematic view showing the interaction between a smart key of a vehicle and a driver's smartphone, and FIG. 2 is a view showing an exemplary embodiment of a method of operating a smart key of a vehicle.

In FIG. 1, a head unit 110 of a vehicle 100 may control the vehicle 100, and may send and receive a signal to or from a smart key 120 provided in the vehicle 100 through a controller area network (CAN) communication. The head unit 110 may include an audio/video (A/V) system and/or a navigator. CAN communication is a normal communication standard designed for communication between various devices, including a microcontroller, in the vehicle 100 without a host computer.

A smartphone 200 carried by a driver of the vehicle may send and receive a signal to or from the head unit 110, for example, through Bluetooth (BT) communication.

In the method of operating the smart key of the vehicle according to the embodiment shown in FIG. 2, the smart key of the vehicle may be controlled using a smartphone, in place of a fob.

The vehicle may be provided with a head unit and a smart key device, and the driver of the vehicle may carry a smartphone. Various terminals may be used in place of the smartphone. For example, terminals configured for performing BT communication, including a tablet PC and a personal digital assistant (PDA), may be used. The smartphone may be paired with the head unit of the vehicle.

The driver may push a toggle button 140 of a door of the vehicle (S110).

When the toggle button is pushed, the smart key device of the vehicle may be turned on. The smart key device may enter an active mode (S120).

Subsequently, the smart key device may turn on the head unit of the vehicle (S130).

Subsequently, the head unit of the vehicle may turn on the driver's smartphone through BT communication (S140).

When the driver's smartphone receives a signal through BT communication, an application in the smartphone may be executed to display a window for inputting a password. To the present end, an application for unlocking a door of the vehicle and igniting an engine of the vehicle in place of the fob should be installed in the driver's smartphone in advance.

When the driver inputs a password or a personal identification number (PIN) code in the window of the smartphone, the smartphone sends the password or the code to the head unit of the vehicle through BT communication.

Upon receiving the password or the code from the smartphone (S150), the head unit determines whether the received password or code is identical to a predetermined PIN code (S160).

Upon determining that the received password or code is identical to the predetermined PIN code, the head unit of the vehicle may unlock the door of the vehicle (S170).

The unlocking of the door of the vehicle will be described in detail infra. When the head unit of the vehicle authorizes the driver's smartphone using the above method, the head unit may send an authorization success signal to the smart key device, the smart key device may send a door-unlocking signal to a door controller, which controls the door, and the door controller may unlock the door.

Hereinafter, a door control method and an engine ignition method will be referred to as embodiments of the vehicle control method using the smartphone.

Figure 3:
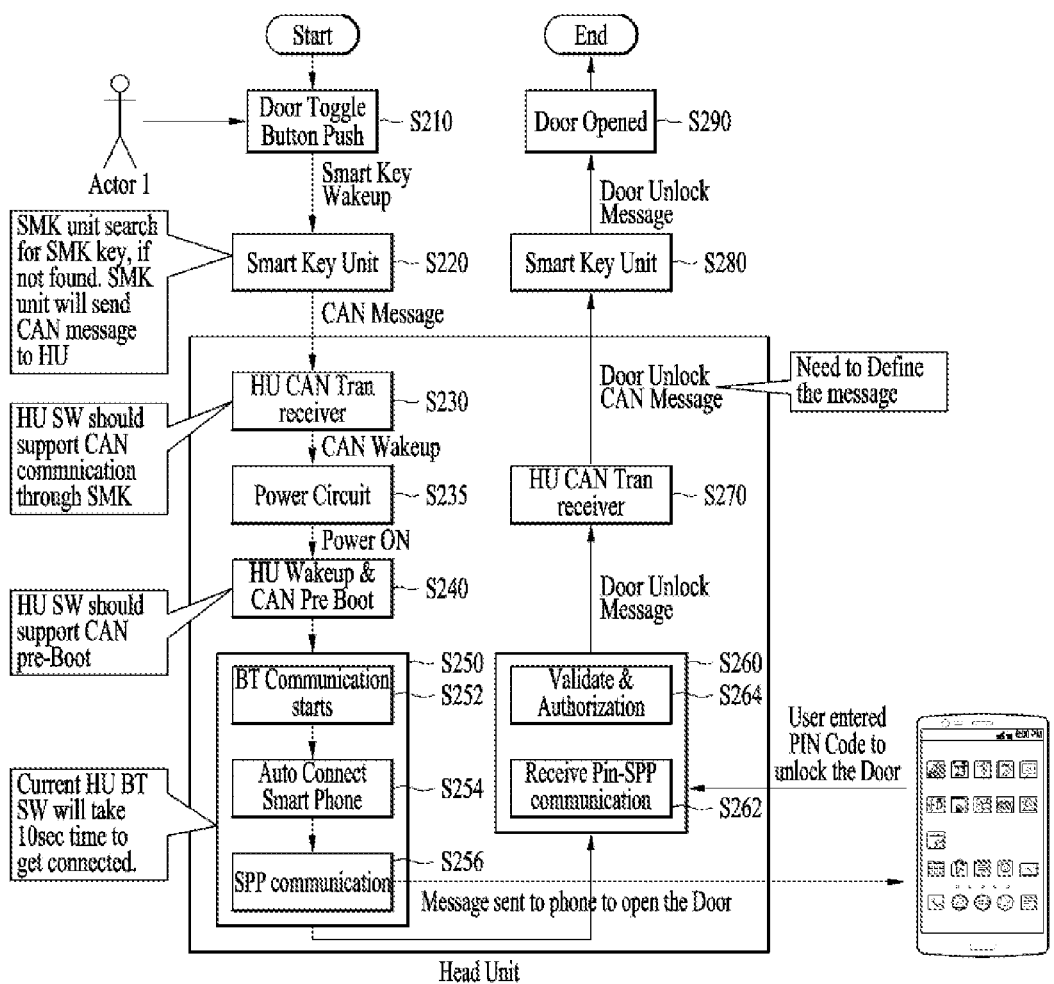
FIG. 3 is a view showing an exemplary embodiment of a method of unlocking a door of a vehicle using a smartphone.
Figure 4:
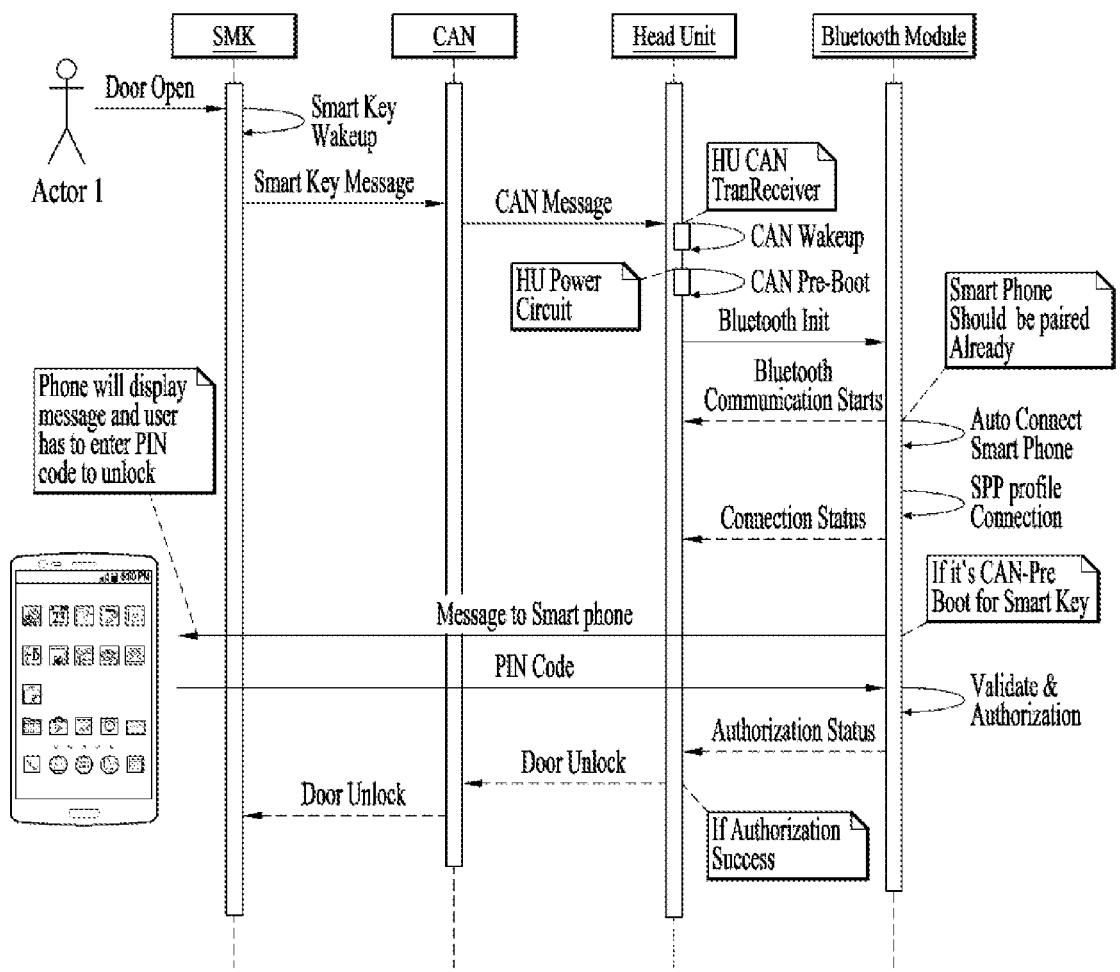
FIG. 4 is a sequence chart of FIG. 3.

FIG. 3 is a view showing an exemplary embodiment of a method of controlling a door of a vehicle using a smartphone, and FIG. 4 is a sequence chart of FIG. 3. Hereinafter, the method of controlling the door of the vehicle using the smartphone will be described with reference to FIG. 3 and FIG. 4.

The vehicle may be provided with a head unit and a smart key device, and a driver of the vehicle may carry a smartphone. The smartphone may be paired with the head unit of the vehicle; however, the smartphone has been paired to the vehicle already (Smartphone Should be paired Already). An application, a description of which will follow, may be disposed in the driver's smartphone. The smart key device of the vehicle may recognize a fob, which is generally carried by the driver, to unlock a door of the vehicle and to ignite an engine of the vehicle. The smart key device may be referred to as a smart key controller.

To unlock or open the door of the vehicle, the driver (Actor 1) may push a toggle button (S210).

When the toggle button is pushed, the smart key device of the vehicle may be turned on (Smart Key Wakeup). The smart key device may enter an active mode (S220).

At the present time, the smart key device searches for a fob. When the driver is not carrying the fob, i.e. when the fob has not been found within a predetermined distance, the smart key device may send a CAN message (Smart Key Message) to the head unit.

A tranreceiver (HU CAN TranReceiver) of the head unit (HU) of the vehicle may receive the CAN message (S230), and the CAN message may be sent to a power circuit of the head unit to power on the head unit (S235). To the present end, software (SW) of the head unit (HU) should perform CAN communication with the smart key device.

The head unit may be turned on through CAN communication (Wakeup), and may free-boot the CAN message (S240). At the present time, the software of the head unit should execute a CAN free-boot.

The head unit of the vehicle may start BT communication (Bluetooth Init), and may turn on the driver's smartphone through BT communication (S250). The head unit may start BT communication (Bluetooth Communication Starts) (S252), a signal from the head unit may be sent to the driver's smartphone (S254), and the signal may be sent to the smartphone through serial port profile (SPP) communication (SPP connection) (S256). At the present time, it may take approximately 10 seconds for Bluetooth software of the head unit to send a signal to the driver's smartphone.

Subsequently, the driver's smartphone may perform an authorization procedure (S260), which will be described in detail.

The driver's smartphone may be provided with a Bluetooth module. When a signal for opening the door of the vehicle is sent from the head unit to the driver's smartphone, the driver's smartphone may be automatically connected to the head unit (Auto Connect Smartphone).

Subsequently, an application in the driver's smartphone may be executed to display a window for inputting a password. The driver (user) may input a PIN code on the smartphone (Phone will display message and user has to enter PIN code to unlock).

The smartphone may receive the PIN code input by the driver, and may perform an authorization procedure through SPP communication (S262) (Validation & Authorization) (S264).

Subsequently, a door open or unlock message may be sent to the tranreceiver of the head unit (S270). At the present time, the head unit may determine whether the PIN code received from the smartphone is identical to a predetermined PIN code to complete the authorization procedure.

When the received password or code is identical to the predetermined PIN code to enter the authorized status, i.e. when authorization has succeeded (If Authorization Success), the head unit may send the door unlock message to the smart key device (S280).

Subsequently, the smart key device may open the door of the vehicle in response to the door unlock message (S290).

Although not shown in FIG. 3, when the PIN code input through the application in the driver's smartphone and sent to the head unit is not identical to the predetermined PIN code, the head unit may send a PIN code re-input signal to the smartphone.

In addition, sending of the PIN code re-input signal may be limited to prevent a third party from unlocking the door of the vehicle without permission in consideration of the case in which the driver's PIN code input is not a simple case of user error.

Figure 5:
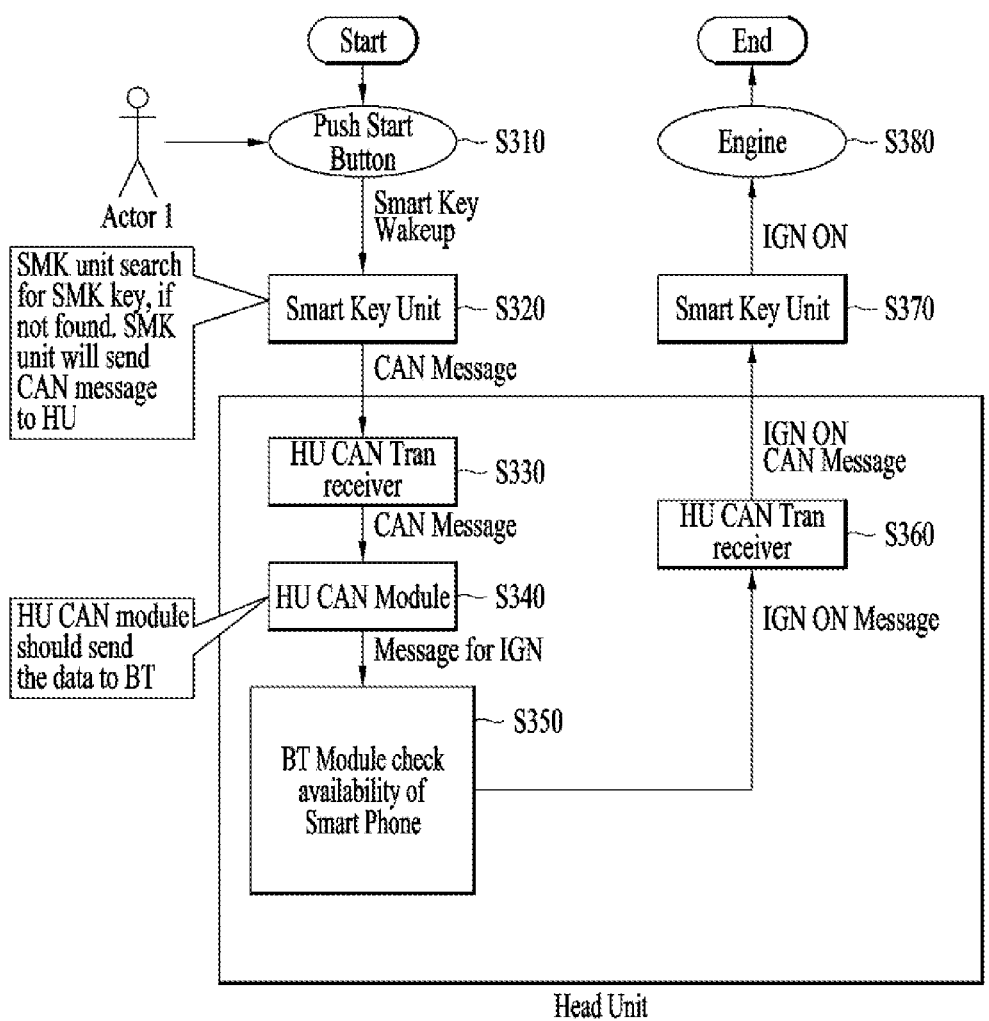
FIG. 5 is a view showing an exemplary embodiment of a method of igniting an engine of a vehicle using a smartphone.
Figure 6:
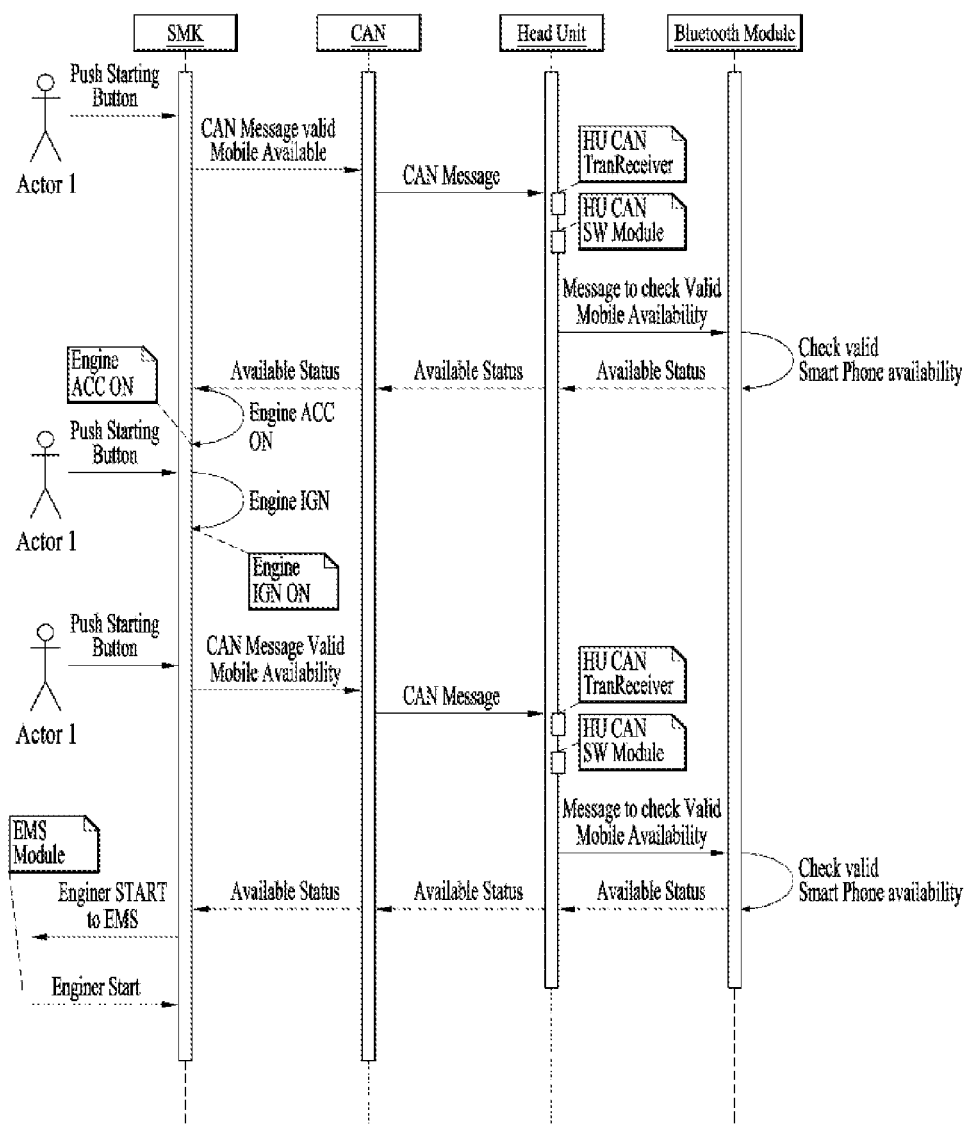
FIG. 6 is a sequence chart of FIG. 5.

FIG. 5 is a view showing an exemplary embodiment of a method of igniting an engine of a vehicle using a smartphone, and FIG. 6 is a sequence chart of FIG. 5. Hereinafter, the method of igniting the engine of the vehicle using the smartphone will be described with reference to FIG. 5 and FIG. 6.

The vehicle may be provided with a head unit and a smart key device, and a driver of the vehicle may carry a smartphone. The smartphone may be paired with the head unit of the vehicle.

In the present embodiment, the vehicle may be a vehicle in which the door has been open using the method of controlling the door of the vehicle using the smartphone. However, the prevent invention is not limited thereto. For example, the present embodiment may apply to the case in which a driver carrying a fob rides in a vehicle and the fob is not available due to the discharge of a smart key, or to the case in which the door of the vehicle is unlocked but a driver not carrying a fob attempts to drive the vehicle.

The driver (Actor 1) may push a start button to start the engine of the vehicle (S310).

When the start button is pushed, the smart key device of the vehicle may be turned on (Smart Key Wakeup), and the smart key device may enter an active mode (S320).

The smart key device searches for a fob (CAN message Valid Mobile Available). When the fob has not been found, i.e. when the driver is not carrying the fob, the smart key device may send a CAN message (Smart Key Message) to the head unit.

A tranreceiver (HU CAN TranReceiver) of the head unit (HU) of the vehicle may receive the CAN message (S330), and may send the received CAN message to a module of the head unit (HU CAN Module) (S340).

The head unit of the vehicle may start BT communication (HU CAN module should send the data to BT), and may send a message for turning on the engine of the vehicle (message for engine). For example, a Bluetooth module of the head unit may check whether there is an available smartphone (BT module checks availability of smartphone) (S350).

When the door of the vehicle has been open through the above method using the smartphone, which is a driver authorization using the smartphone, the vehicle engine ignition on message may be sent.

Alternatively, the procedure of authorizing the driver of the vehicle may be performed through the same method as the vehicle door opening method using the smartphone.

For example, the head unit may turn on the driver's smartphone through BT communication, the head unit may start BT communication, a signal from the head unit may be sent to the driver's smartphone, and the signal may be sent to the smartphone through SPP communication.

Subsequently, the driver's smartphone may perform an authorization procedure, which will be described in detail infra.

The driver's smartphone may be provided with a Bluetooth module. When a signal for igniting the engine of the vehicle is sent from the head unit to the driver's smartphone, the driver's smartphone may be automatically connected to the head unit. Subsequently, an application in the driver's smartphone may be executed to display a window for inputting a password. The driver may input a PIN code on the smartphone.

The smartphone may receive the PIN code input by the driver, and may perform an authorization procedure through SPP communication.

Subsequently, an engine ignition on message may be sent to the tranreceiver of the head unit (S360). At the present time, the head unit may determine whether the PIN code received from the smartphone is identical to a predetermined PIN code to complete the authorization procedure.

When the received password or code is identical to the predetermined PIN code to enter the authorized status, i.e. when authorization has succeeded, the head unit may send the engine ignition on CAN message to the smart key device (S370).

Subsequently, the smart key device may send an engine ignition on signal in response to the engine ignition on message to turn on the engine of the vehicle (S380).

The vehicle engine ignition procedure may be subdivided as shown in FIG. 6. First, vehicle engine acceleration may be turned on in response to an engine acceleration on signal (Engine ACC ON). When the driver continues to push the start button, the smart key device may send an engine ignition on signal (Engine IGN ON) to ignite the engine.

When the driver continues to push the start button, the engine may be driven through the same method as when the engine acceleration is on, whereby the vehicle is run.

In another exemplary embodiment, the vehicle control method may be recorded in a recording medium, including a compact disk (CD) or a universal serial bus (USB) memory, as a readable program, and the program may be executed by a processor, including a computer, to realize the vehicle control method.

In the computer-readable recording medium containing the vehicle control method and program according to the embodiment, the driver may input a PIN code through the application disposed in the smartphone even when the driver rides in the vehicle without a fob wherein the head unit performs door unlock and engine ignition through BT communication.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle control method using a smartphone, the method comprising:
    pairing the smartphone of a driver with a head unit of a vehicle;
    turning on, by the head unit, an application in the smartphone through Bluetooth communication;
    authorizing the driver through the application in the smartphone; and
    unlocking, by the head unit, a door of the vehicle through a smart key device of the vehicle,
    wherein a personal identification number (PIN) code is input through the application in the smartphone, and
    wherein the PIN code input to the smartphone is sent to the head unit through a serial port profile (SPP) communication.

2. The vehicle control method according to claim 1, further including entering, by the smart key device, an active mode when the driver pushes a toggle button of the vehicle.

3. The vehicle control method according to claim 2, further including waking up, by the smart key device, the head unit through a controller area network (CAN) communication.

4. The vehicle control method according to claim 1, wherein the step of authorizing the driver includes determining, by the head unit, whether the received PIN code is identical to a predetermined PIN code.

5. The vehicle control method according to claim 4, further including sending, by the head unit, a door unlock signal to the smart key device upon determining that the received PIN code is identical to the predetermined PIN code.

6. The vehicle control method according to claim 5, wherein the door unlock signal is sent in a form of a CAN message.

7. The vehicle control method according to claim 5, further including sending, by the head unit, a PIN code re-input signal to the smartphone upon determining that the received PIN code is identical to the predetermined PIN code.

8. A computer-readable recoding medium containing:
    a vehicle control method using a smartphone, the method comprising:
        pairing the smartphone of a driver with a head unit of a vehicle;
        turning on, by the head unit, an application in the smartphone through Bluetooth communication;
        authorizing the driver through the application in the smartphone; and
        unlocking, by the head unit, a door of the vehicle through a smart key device of the vehicle,
        wherein a personal identification number (PIN) code is input through the application in the smartphone, and
        wherein the PIN code input to the smartphone is sent to the head unit through a serial port profile (SPP) communication, and
    a program configured such that the vehicle control method is realized by a processor.

* * * * *